Jan. 12, 1937. J. A. SMITMANS 2,067,509

FLYING SHEAR

Filed Jan. 21, 1936 2 Sheets-Sheet 1

WITNESSES
A B Wallace
J E Dickman

INVENTOR.
John A. Smitmans
BY Brown, Critchlow & Flick
his ATTORNEYS

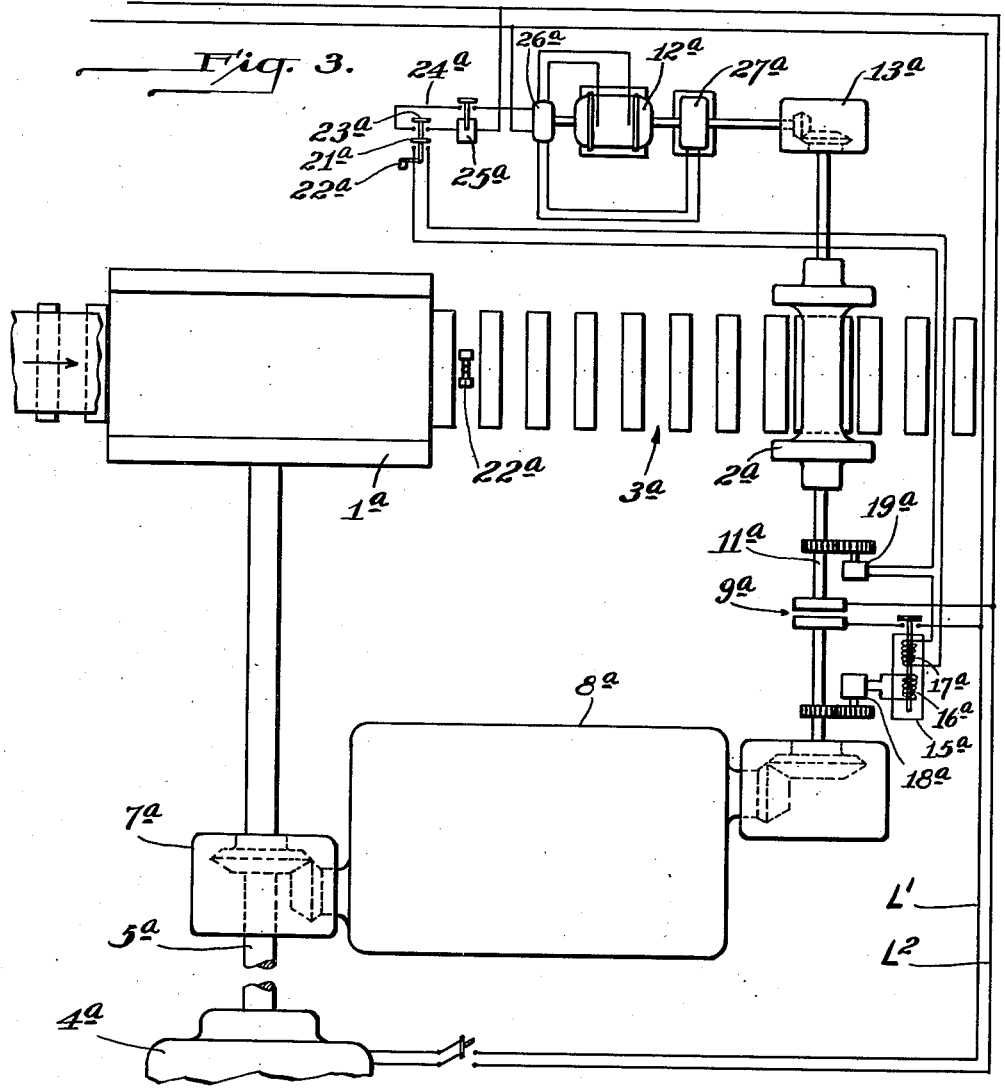
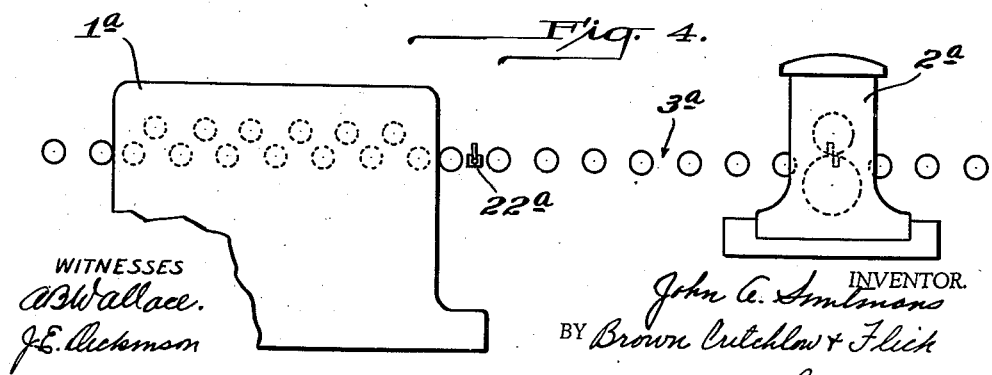

Patented Jan. 12, 1937

2,067,509

UNITED STATES PATENT OFFICE 2,067,509

FLYING SHEAR

John A. Smitmans, Pittsburgh, Pa., assignor to United Engineering & Foundry Company, Pittsburgh, Pa., a corporation of Pennsylvania Application January 21, 1936, Serial No. 60,144

18 Claims. (Cl. 164—68)

This invention relates to what is commonly referred to as a flying shear, and more particularly, although not necessarily so limited, to a shearing apparatus of this character which is adapted to both remove the crop ends from and accurately sever metal strip into preselected lengths while it is in motion.

In continuously operated shears of this kind, as is contemplated by this invention, the lengths of the cuts are customarily determined by the ratio of the speeds of the shear and strip and are varied by varying either the speed of the strip with respect to the shear or that of the shear with respect to the strip, and the latter is usually preferred as the strip as a rule is delivered to the shear from some other work device, such as a mill, which prevents any convenient variation of its speed. Also, in order to produce accurately cut lengths it is necessary to positively synchronize the strip-feeding mechanism with the shear-driving mechanism to prevent any variation in travel of the two between cuts. To accomplish this, a positive connection between the two is ordinarily required, and if the shear is to be adapted to cut a wide variety of lengths, this connection must be widely adjustable. This usually entails the use of a complicated gear change unit or its equivalent, and normally the inertia of such units is so large that it is impossible to start a shear through them with sufficient rapidity to economically control the length of the first or cropping cut if the strip is fed to the shear at random and with any very great speed as it preferably is.

To overcome such difficulty it is an object of the invention to provide for starting the shear in an assembly of this character by means of an auxiliary motor which is capable of rapidly bringing the shear up to speed for crop-end cutting and for then automatically connecting it to a change gear unit which is in turn connected to a main shear motor that also drives the material feeding means whereby insuring the subsequent cuts being of accurate length.

Another object is to provide for furnishing the operating power for the shear from either the starting motor, or the power means connected to the feed drive and shear, or from both of them together.

Figure 1:
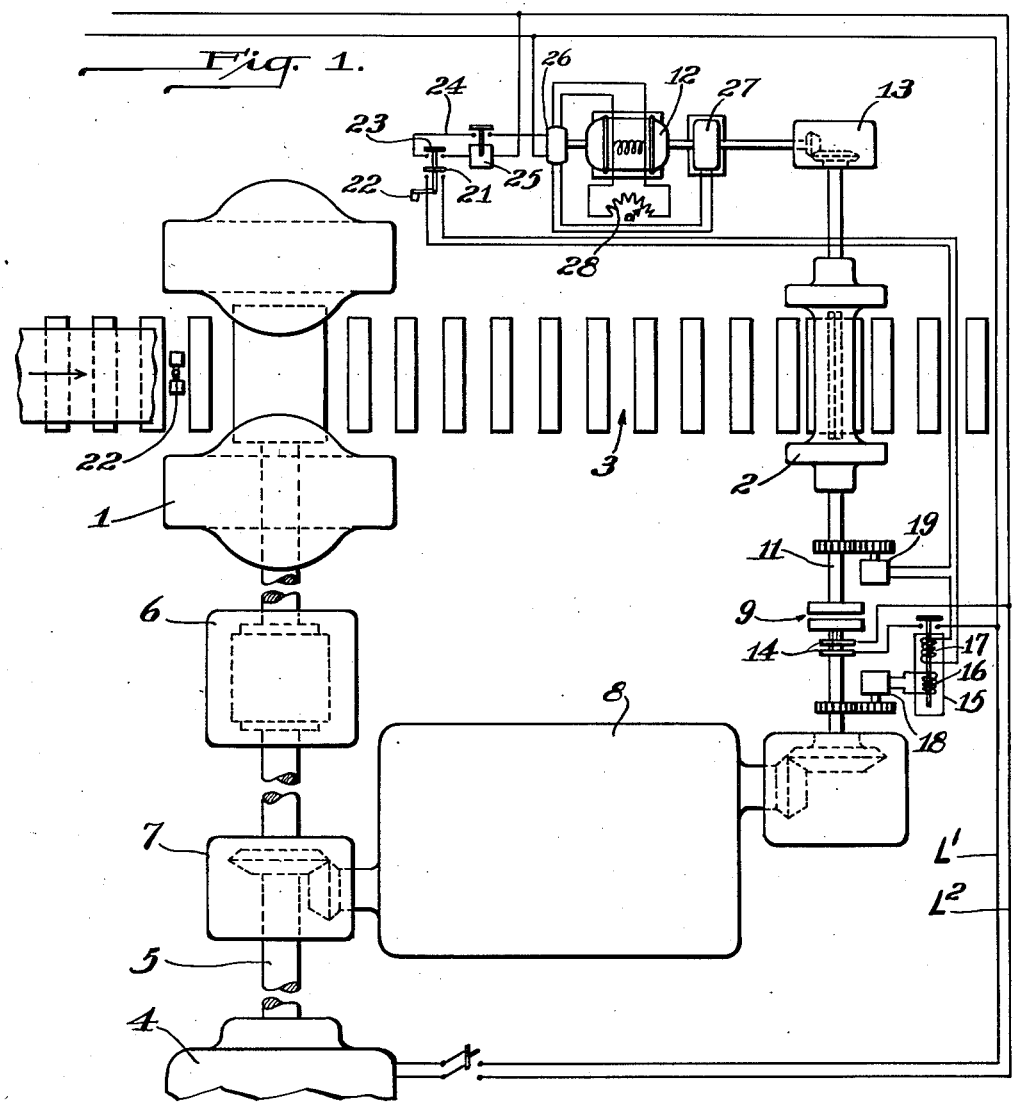
Figure 2:
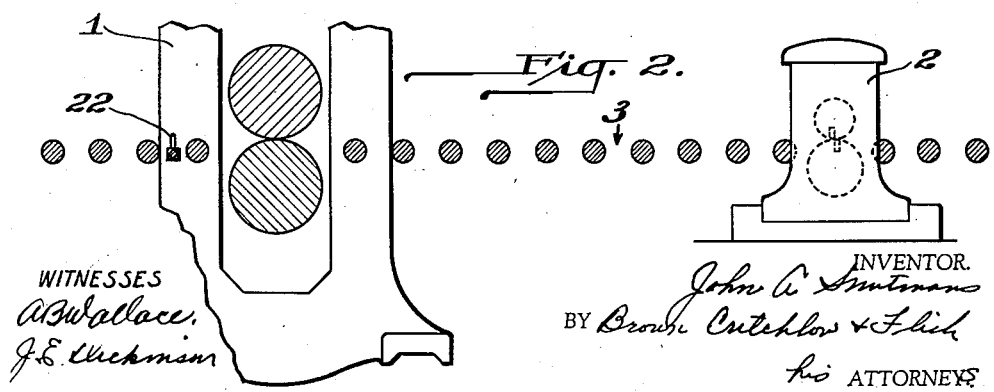

These and various other objects and features of the invention as well as the advantages thereof not previously discussed will be more fully apparent when the following detailed description is read in conjunction with the accompanying drawings, of which Fig. 1 is a plan view of a shearing assembly embodying the invention in which a rolling mill constitutes the means for delivering the strip to the shear; Fig. 2 a side elevation of the same assembly; Fig. 3 a view similar to Fig. 1 of an embodiment of the invention wherein a roller leveler comprises the strip-feeding means, and Fig. 4 a side elevation of the latter assembly.

Referring in detail to the embodiment of the invention illustrated in Figs. 1 and 2, the numeral 1 designates a rolling mill which, for example, may be the last stand of a continuous strip mill, and the numeral 2 a flying shear of any suitable well-known construction which is arranged in the delivery table 3 at the discharge side of the mill. As illustrated, a motor 4 is connected by a drive shaft 5 and pinion stand 6 to the rolls of the mill and also by miter gears 7 through a gear change unit 8 to the shear. Thus provision is made for positively operating the shear in synchronism with the mill or strip feed, to insure the accurate cutting of selected lengths. While any suitable form of gear change unit 8 may be utilized in this connection, a unit of the type disclosed in United States Patent No. 1,852,282 is recommended because of the increment adjustments which it affords for varying the lengths of the cuts.

With this arrangement it obviously is not feasible to stop the mill to control the length of the first or front end cropping cut and it is also impractical to do so by controlling the delivery of the strip to the mill. To accomplish such an end a clutch 9 is interposed in the shaft 11 by which the gear change unit 8 is connected to one end of the shear so that the shear can be readily disconnected from the mill drive and an auxiliary motor 12 is connected to its opposite end through a gear box 13 so that the shear can be started at will. Thus with the mill or feeding mechanism running continuously the shear can be maintained in an idle state until a piece of strip is delivered to it. It can then be started by the auxiliary motor in timed relation with the approach of the front end of the strip to control the length of the first or crop cut and also be connected to the gear change unit 8 to insure the subsequent cuts being of accurate length.

While any suitable clutch may be used between the gear change unit 8 and the shear, a magnetically operated clutch 9 is schematically illustrated in the embodiments of the invention shown. To energize this clutch a pair of slip rings 14 is mounted adjacent to it on the drive shaft 11 and connected to its operating windings, not shown. These rings are in turn connected to a source of current supply represented by the conductors L1 and L2 by means of an electromagnetic contactor 15. For actuating such contactor so that the clutch will be engaged as soon as the shear is brought up to speed by the auxiliary motor 12, it is provided with a pair of opposed operating coils 16 and 17 which receive their actuating current from a pair of pilot generators 18 and 19, respectively. The first of these generators, as shown, is connected to the drive shaft 11 on the side of the clutch adjacent the gear change unit, and hence is driven at a speed corresponding with that of the mill or strip feed. The other generator 19 is also connected to the drive shaft 11 but on the shear side of the clutch so as to be driven in accordance with the speed of the shear, rendering it responsive to the operation of the shear by the auxiliary motor 12.

The electromagnetic contactor 15 which also may be otherwise constructed is shown as being one of the balanced type which closes whenever the current supplied to its coil 17 by the generator 19 is equal to that furnished to its coil 16 by generator 18 and opens whenever the current from generator 19 is interrupted. The purpose of interrupting the flow of current from the latter generator is to make it possible to disengage the clutch so as to stop the shear whenever the auxiliary motor 12 is stopped. To accomplish this the circuit extending from the generator 19 to the coil 17 is connected through the bridging member 21 of a flag switch 22 which is arranged in the path of the strip entering the mill and adapted to be closed by the strip as it approaches the shear and to be opened after the strip passes over it. This flag switch 22 which is provided primarily for starting and stopping the shear is equipped with a second bridging member 23 which is connected in and utilized for controlling the energizing circuit 24 of the auxiliary motor 12. As illustrated, this latter circuit also includes an adjustable time delay relay 25 and a limit switch 26 which is connected to the auxiliary motor. This limit switch is adapted in a well-known manner to deenergize the motor 12 after the time delay relay is opened by the flag switch and to apply a brake 27 mounted on the shear shaft in such a way as to always bring the shear blades to rest in a selected position, while the time delay relay is capable of being adjusted to so control the starting of the shear after the flag switch 22 is operated as to accurately determine the length of the first cut.

In the operation of the invention the roll stand or feeding mechanism and gear change unit 8 are operated continuously while the shear is normally operated only when a piece of strip is passing through it. When the front end of a piece of strip passes over the flag switch 22 it causes the bridging members 21 and 23 to close. These, in closing, close the operating circuits of generator 19 and the time delay relay 25, respectively. With the operation of the time delay relay the brake 27 is released, the motor 12 started, and the shear brought up to cutting speed by the auxiliary motor 12 in timed relation with the entrance into the shear of the front end of the strip to be sheared. As the speed of the shear reaches that of the gear unit 8 the current in coil 17 of contactor 15 becomes strong enough to close the electromagnetic contactor 15, causing the clutch 9 to be engaged. Thereafter the speed of the shear is positively synchronized with the speed of the mill drive to positively regulate the length of the succeeding cuts.

In such an installation because of the rigidity of the drive connected to the gear change unit it is desirable to relieve the latter of as much of the cutting shock as is possible. To do this, the auxiliary motor may be provided with a field rheostat 28 and this adjusted to cause the auxiliary motor to attempt to drive the shear at a higher rate of speed than the gear change unit. By doing this, when the shear makes a cut, and encounters a resistance, instead of transmitting the shock thereof to the gear change unit against the mill drive it will be consumed in the most part by the play in the connections between the shear and the mill drive. When so operated all, in effect, that the gear change unit is required to do is to function as a regulator for definitely synchronizing the speed of the shear with that of the strip.

It will be appreciated, however, that if it is so desired the auxiliary motor may be adjusted to divide the shearing load with the mill drive or place it entirely on the latter. When the latter is done, as will also be appreciated the auxiliary motor may be completely deenergized as soon as the clutch 9 is engaged.

In the embodiment of the invention illustrated in Fig. 3, wherein the parts thereof corresponding to those of Fig. 1 are designated by the same reference characters with the suffix *a* attached, instead of the strip being delivered to the shear by a rolling mill it is delivered thereto by a pair of pinch rolls or roller leveler 1a as shown. Like the previous embodiment, this is provided with a main driving motor 4a which is connected to the roller leveler and through a gear change unit 8a and a magnetic clutch 9a to the shear 2a, the latter being also equipped with a starting motor 12a through a gear box 13a. The control for this embodiment of the invention, the description of which will not be repeated, may be identical with that previously described in connection with Fig. 1 except that the speed control for the auxiliary motor may be omitted. This latter is true because with the smaller driving motor 4a there may be no necessity for driving the auxiliary motor 12a at a higher speed than the main motor to protect the gear change unit against the cutting shocks as previously described as the main motor will yield to the cutting impacts of the shear more readily than would the mill motor.

As in the previous embodiment, it will be appreciated that the gear change unit may be used merely for the purpose of synchronizing the shear and feed. Preferably, however, with this arrangement the normal cutting load will be carried entirely by the main motor, although if desired the load may of course be split between the two motors in the manner mentioned.

It will also be appreciated that the control for the magnetic clutch and auxiliary motor may be modified in a manner which will be readily apparent to those skilled in the art to accommodate the use of the shear for cropping the trailing end of the material as well as the front end, and for also adapting the system for use only for cropping the ends of the strip as well as for doing this together with cutting the strip into preselected lengths.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. In combination, a flying shear, means for feeding strip material into said shear, means for driving said feeding means continuously, means for releasably connecting said driving means to said shear, and auxiliary driving means connected to said shear.

2. In combination, a flying shear, means for feeding strip material into said shear, means for driving said feeding means continuously, speed-change means positively operable by said driving means and releasably connected to said shear, and auxiliary driving means for starting said shear.

3. In combination, a flying shear, means for feeding strip material into said shear, means for driving said feeding means, clutch means for positively connecting said shear to said driving means, auxiliary driving means for starting said shear and bringing it up to the speed of said feeding means, and means for engaging said clutch when said speed is reached.

4. In combination, a flying shear, means for feeding strip material into said shear, means for driving said feeding means, means including a clutch for positively connecting said driving means to said shear, auxiliary driving means connected to said shear, means responsive to the strip entering the shear for starting said auxiliary driving means, and means operable when the speed of the shear reaches a predetermined value for engaging said clutch.

5. In combination, a flying shear, means for feeding strip material into said shear, means for driving said feeding means continuously, means for starting said shear, and means for positively connecting said shear to the drive of said feeding means to insure synchronous operation of the shear and feed.

6. In combination, a flying shear, means for feeding strip material into said shear, means for driving said feeding means, a motor connected directly to said shear, means for starting said motor to control the length of the first cut, and means for positively connecting the drive for said feeding means to said shear to thereby regulate the lengths of the subsequent cuts.

7. In combination, a flying shear, means for feeding strip material into said shear, means for driving said feeding means, a driving motor connected to said shear, means for starting said motor to control the length of the first cut, means for positively connecting the drive for said feeding means to said shear to thereby accurately regulate the length of the subsequent cuts, and means for bringing said shear to rest in a preselected starting position each time it is stopped.

8. In combination, a flying shear, means for feeding strip material into said shear, means for driving said feeding means continuously, a motor connected to said shear, means for starting said motor in timed relation with the entrance of the strip in the shear to control the length of the first cut, means for tying said shear and feeding means together for positive synchronous operation, and means for varying the speed of the shear with respect to that of the feeding means.

9. In combination, a flying shear, means for feeding strip material into said shear, means for driving said feeding means continuously, positively operable speed-change means connected to said driving means, a releasable clutch for connecting said shear to said speed-change means, a motor directly connected to said shear, means for engaging and disengaging said clutch to permit starting and stopping of said shear independently of said feeding means, means for stopping the shear with its cutting blades in a preselected position, means for starting said motor in timed relation with the entry of a strip into the shear, and means for engaging said clutch when the shear is operating at a selected speed.

10. A combination according to claim 9 characterized by said motor-starting means being responsive to the strip.

11. A combination according to claim 9 including means responsive to the strip for automatically starting and stopping said motor.

12. A combination according to claim 9 including means responsive to the speed of the strip cooperating with means responsive to the shear for automatically engaging said clutch.

13. A combination according to claim 9 including means responsive to the strip for controlling the engagement and disengagement of said clutch.

14. A combination according to claim 9 including means responsive to the strip for starting said motor which may be adjusted to vary the length of the first cut.

15. In combination, a rolling mill, a flying shear disposed to receive strip material as it is discharged from the mill, a motor for operating said mill, a second motor connected to said shear, means for starting said second motor in timed relation with the entrance of the strip into the shear, and means including a clutch for positively mechanically connecting said shear to said mill motor to insure synchronous operation between the strip and shear.

16. In combination with a flying shear, means responsive to the moving material to be sheared for accelerating said shear from a position of rest to full cutting speed before a cut is made, and other means operated in positive synchronism with the movement of the material being sheared for assuming the drive of the shear after it has been accelerated to a predetermined speed.

17. In a flying shear, means responsive to the moving material to be sheared for accelerating said shear from a position of rest to full cutting speed before a cut is made, other means responsive to the movement of the material being cut for operating said shear after it is brought up to selected cutting speed.

18. In a flying shear a normally continuously operated feeding means, a normally stationary shear, a drive for said feeding means, a drive for said shear, and means for automatically connecting said feeding means drive to said shear after said shear has been accelerated to a preselected speed, and means connected to said latter driving means for delivering material to be sheared to the shear.

JOHN A. SMITMANS.